United States Patent Office 3,667,738
Patented June 6, 1972

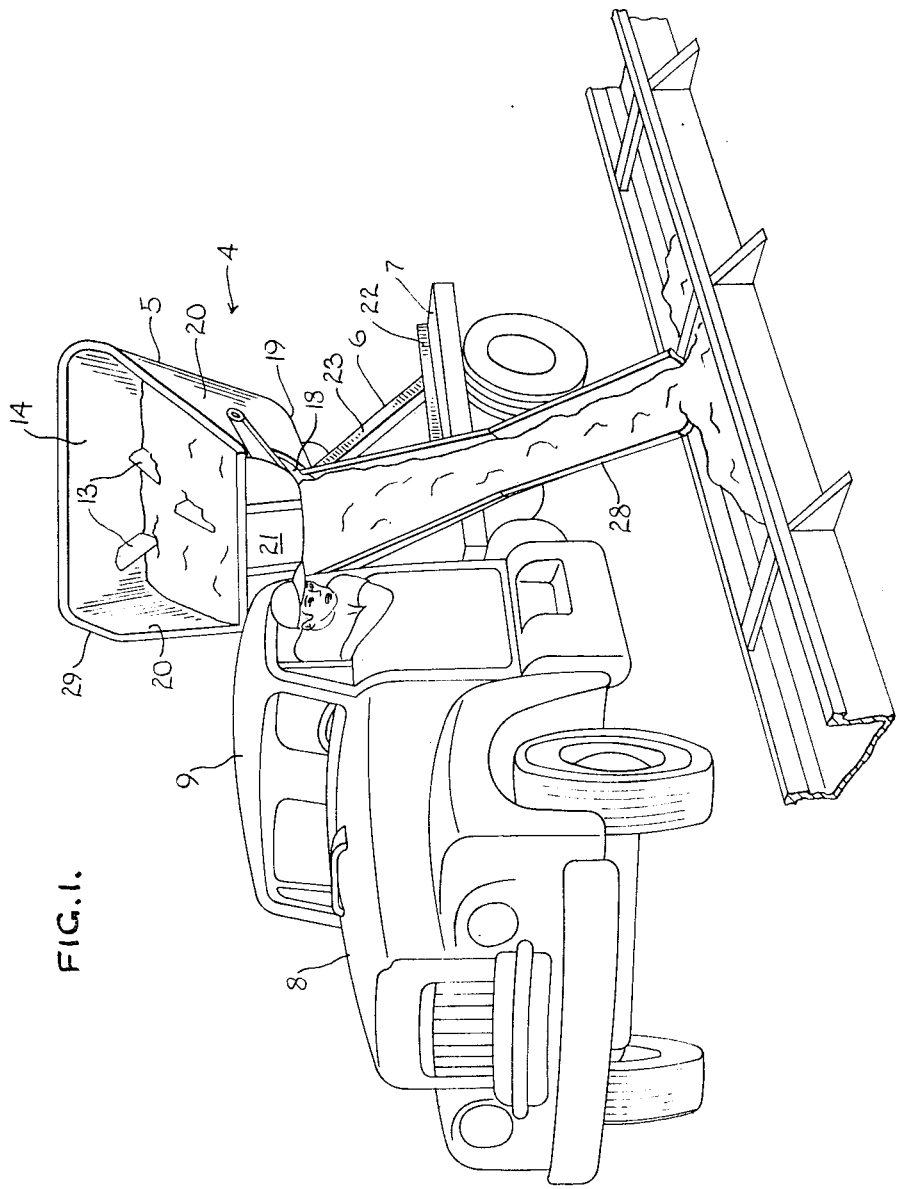

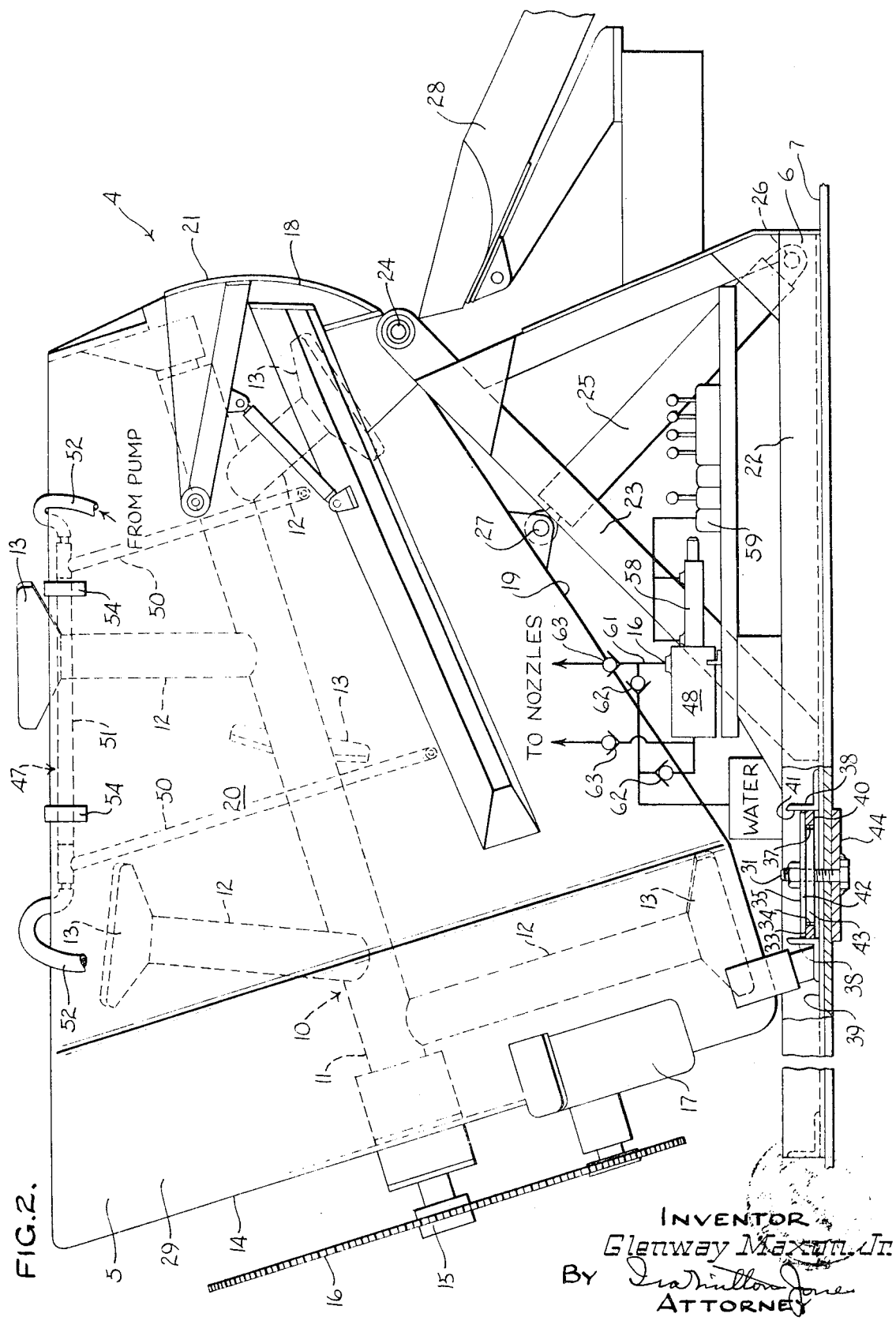

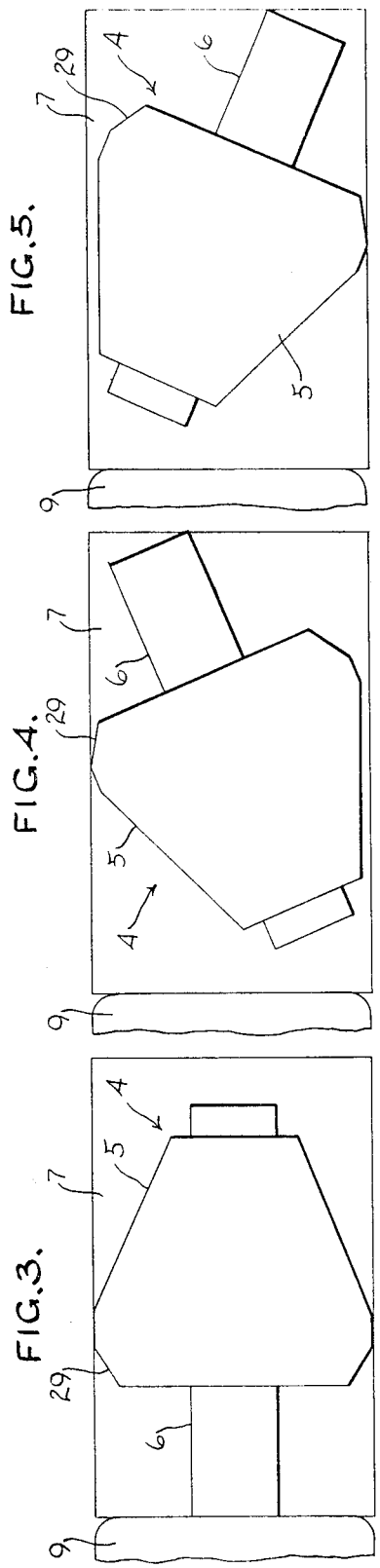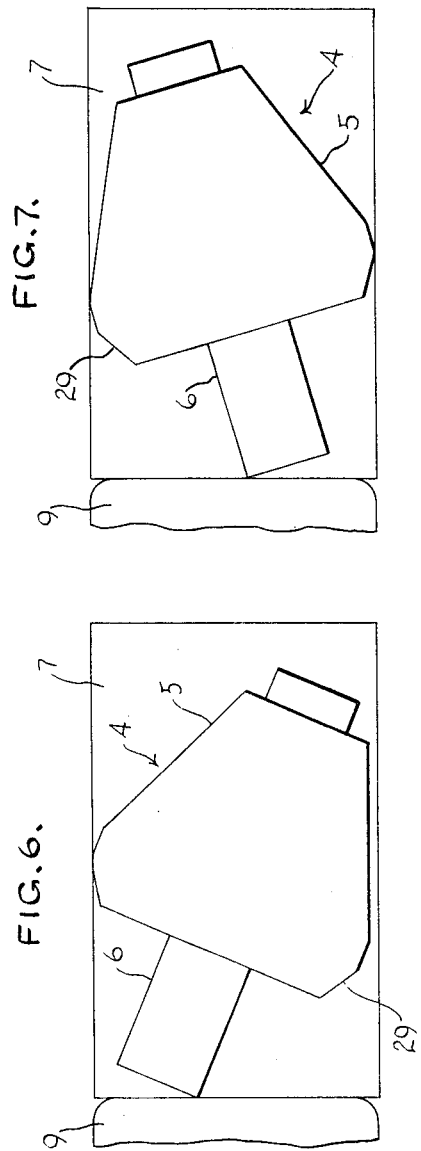

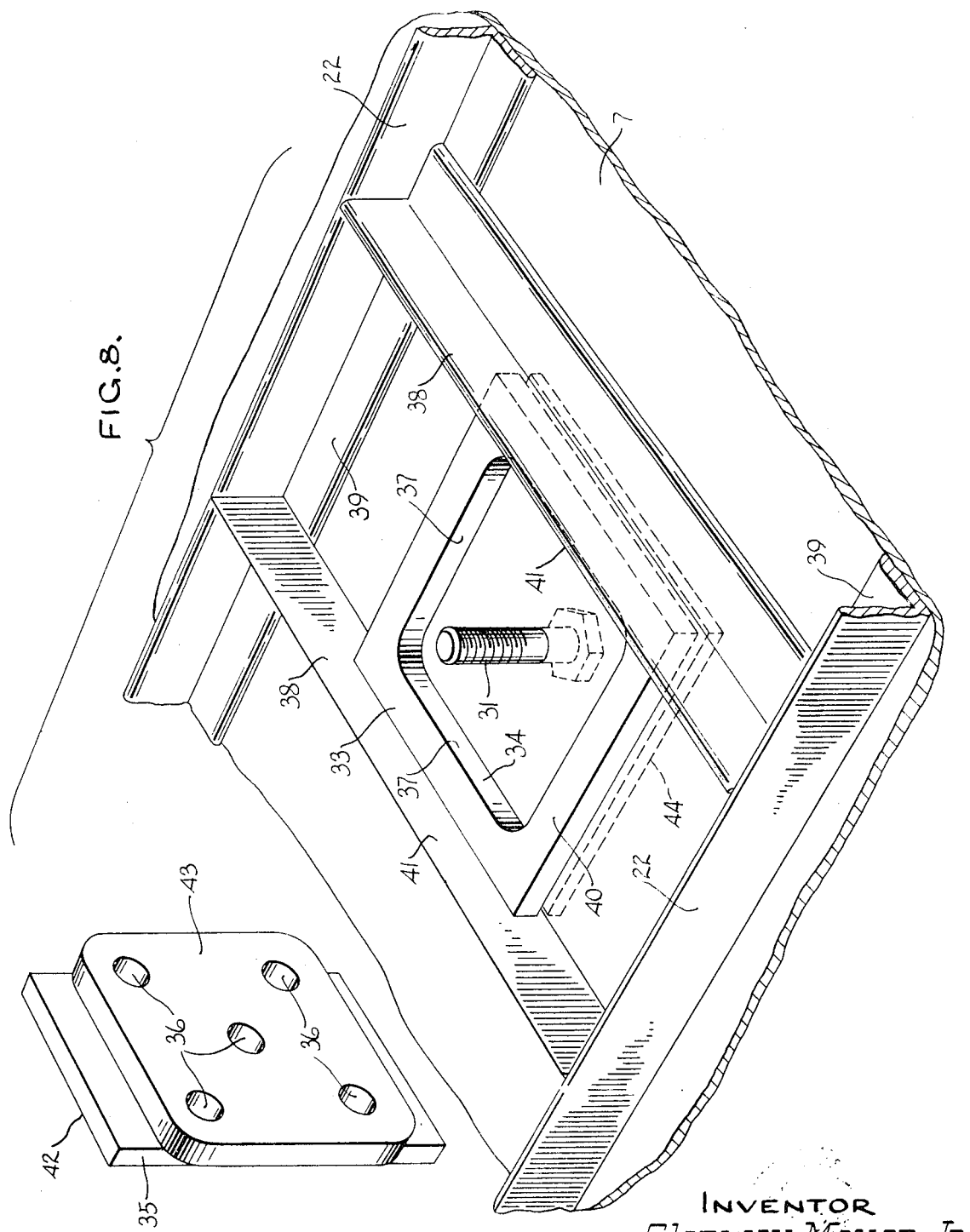

3,667,738
DUMP BODY FOR CONCRETE MIX
Glenway Maxon, Jr., Milwaukee, Wis.
Filed Mar. 11, 1971, Ser. No. 123,262
Int. Cl. B28c 5/18
U.S. Cl. 259—171
12 Claims

ABSTRACT OF THE DISCLOSURE

A frame structure tiltably supporting a dump body is removably mounted on a flat bed truck. The body side walls converge toward a discharge outlet at one end of the body, from a zone nearer its other end, and also converge towards said other end from said zone. Its bottom wall inclines upwardly towards the outlet from said zone. Preferably the body is mounted with its plane of symmetry oblique to the longitudinal centerline of the truck chassis, discharge outlet forwardly and at the driver's side; but means are disclosed for securing it to a truck in several orientations.

---

This invention relates to dump bodies for transporting concrete mix and similar materials and for discharging them to a selected site of placement; and the invention is more specifically concerned with a dump body of that character which can be readily removably mounted on the bed of a flat bed truck, can discharge in a direction that greatly facilitates control of the discharge by the driver of the truck without requiring that he move out of his driving position, and can transport substantially large volume loads without exceeding legal overall width limitations for on-highway vehicles.

In many types of construction work contractors find it desirable and profitable to have concrete mix prepared at a central batching plant, from which they transport it to the site at which it is to be placed. In most cases the vehicle or vehicles that transport the concrete must travel on public streets and highways, and must therefore conform to limitations on legal maximum width for on-highway vehicles. In most states, at the present time, the laws prescribe a maximum overall width of eight feet for highway vehicles.

Specialized trucks having dump bodies have come into widespread use for the transport of concrete mix. At the batching plant the dump body is loaded from above, and at the placement site it is tilted to pour the load out of a discharge outlet at one end of the body. In most cases the dump body is arranged and oriented to discharge to the rear of the carrying vehicle chassis, where the driver, from his normal position in the cab, cannot see the concrete issuing from it. Ordinarily, therefore, the controls for body tilting actuation are located near the rear of the vehicle, and the driver must spend a certain amount of his time in getting into and out of the cab and moving to and from the body tilting controls. Furthermore he must so maneuver his truck, prior to pouring, that its rear end— its least visible part—is nearest the site of placement.

Heretofore attempts have been made to arrange a dump body in such a way that the driver could control discharge therefrom without leaving his cab. Such prior proposals are exemplified by the U.S. Pats to Williard, No. 2,859,- 949, and to Duecy Nos. 3,185,450 and 3,367,636. These prior dump body arrangements required rather specialized vehicle chassis and dump body structures, so that they were expensive and could not very well be used for purposes other than the transport of concrete mix and the like.

By contrast, it is an object of the present invention to provide a dump body for concrete mix that can be readily movably mounted on the bed of a flat bed truck and can be arranged to discharge in an obliquely forward direction so that the discharge outlet in the dump body is almost directly beside the cab of the vehicle, within the normal field of vision of the operator thereof when he is in his usual driving position.

It is also an object of this invention to provide a dump body of the character described which is so arranged that it can be readily mounted on the bed of a flat truck and can be oriented with its discharge outlet in any of a number of different positions relative to the truck chassis, including the position adjacent to the driver that has just been described and a position at the hear of the truck for conventional discharge to the rear of the vehicle.

It will be apparent that it is another object of this invention to provide a dump body for transporting and placing concrete and the like that can be readily installed on the bed of a flat bed truck when concrete mix must be hauled for a limited time, and which can be removed at any time to permit the truck to be used for transporting other materials.

The prior patent to Golay, No. 2,358,224, discloses a dump body structure adapted to be removably installed on the flat bed of a pick-up truck and which is mounted on a turntable so that it can be swung around to discharge in any desired direction relative to the body. However, a body structure embodying the teachings of that patent and intended for carrying any worthwhile quantity of concrete mix (say, three cubic yards) would need a relatively expensive turntable structure and a power drive for swinging it, and, moreover, would cause delays in concrete mix placement as the body was rotated into its discharging position. On the other hand, even the small body disclosed in the Golay patent, being of rectangular planform, would exceed legal on-highway width limitations if transported with its longitudinal plane of symmetry substantially out of coincidence with that of the carrying vehicle chassis.

With these further considerations in mind it is another object of the present invention to provide a dump body structure of the character described, capable of carrying in excess of three cubic yards of concrete mix and adapted to be readily removably but non-rotatably mounted on a flat bed truck body at such an orientation as to be capable of discharging in a direction oblique to the longitudinal centerline of the vehicle chassis without exceeding legal width limits for on-highway travel.

It is also an object of this invention to provide dump body structure which lends itself to facile mounting on a flat bed truck, utilizing a single bolt or stud as the principal means of securing the body structure to the truck bed, without posing serious problems with respect to proper positioning of the heavy and massive body structure on the truck bed during its installation.

Another object of this invention is concerned with a problem encountered when water must be added to a batch of concrete mix at the placement site, either because discharge of the batch has been delayed or because the mix is too dry for the particular conditions for which the load is intended. It is difficult to get added water distributed through concrete mix even in a rotating drum mixer, because the water tends to lie on top of the mix and to remain there. Heretofore it has been still more difficult to mix added water into concrete in a dump body, even when the dump body had a rotating agitator therein.

With this in mind, it is an object of the present invention to provide means for adding a predetermined quantity of water to concrete mix in a vehicle dump body of the character described, and for effecting such addition of water in a manner that assures its thorough mixing with the aggregate under the action of a rotary agitator, so that the consistency of the mix can be accurately adjusted immediately prior to its discharge from the body.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of an embodiment of the invention constructed according to the best mode so far devised for the practical application of the principles thereof, and in which:

FIG. 1 is a perspective view of the dump body of this invention mounted on a flat bed truck, with the body oriented to discharge obliquely toward the front of the truck and to that side thereof at which the driver is normally seated;

FIG. 2 is a view of the dump body in side elevation, with the body shown mounted on a truck bed and oriented to discharge to the rear of the truck;

FIGS. 3–7 are more or less diagrammatic plan views illustrating the different positions in which the dump body of this invention can be oriented on a flat bed truck;

FIG. 8 is a fragmentary disassembled perspective view of the structure by which the dump body is secured to a truck bed.

Figure 9:
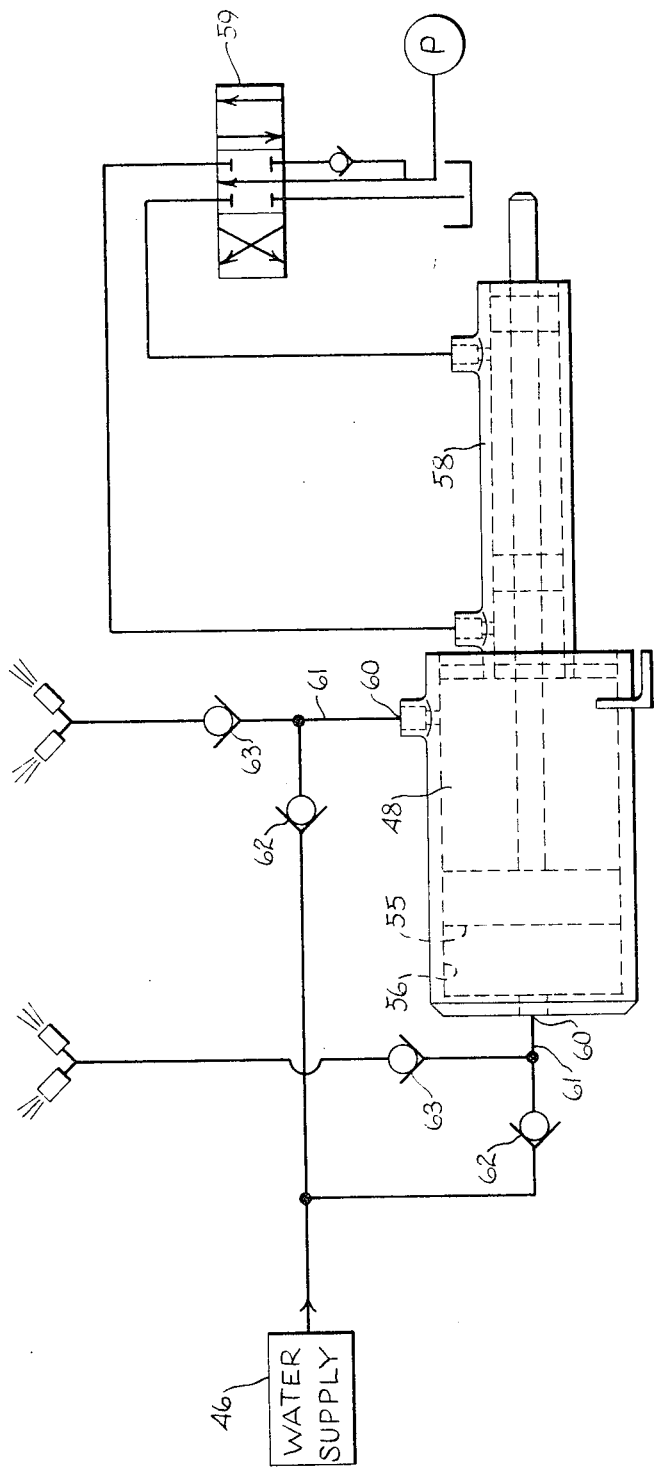
FIG. 9 is a diagram of the means for injecting water into concrete mix in the body.

Referring now more particularly to the accompanying drawings, the numeral 4 designates generally a dump body unit of the present invention, comprising an open-topped hollow body proper, designated by 5, and a frame structure 6 upon which the body is carried for tilting between transit and discharge positions. The dump body unit is shown mounted on the bed 7 of a flat bed truck 8, behind a driver's cab 9 which is at the front of the truck. A flat bed is of course the cheapest type of body with which a truck chassis can be provided, but it is nevertheless very useful and versatile because of the large variety of cargos that can be hauled on it, hence the provision of means for the removable mounting of the body unit 4 on such a truck, as described hereinafter, permits the truck itself, with the dump body unit removed, to be used for a variety of purposes so that it does not represent an idle investment at times when no concrete mix needs to be hauled.

The dump body proper is of the general type disclosed in the Maxon, Jr. patent, No. 2,880,977, but of modified geometry, as described hereinafter, to enable it to carry large loads without exceeding highway width limitations. As shown, the body is provided with a rotary agitator 10 which revolves on an axis within the body and which comprises a shaft 11 that extends lengthwise through the body. A plurality of arms 12 extend substantially radially from the shaft at axially spaced intervals therealong, and a paddle blade 13 is carried on the outer end of each arm. The shaft projects through one end wall 14 of the body (which can be considered its front end) and has a sprocket 15 secured to its projecting end portion to be rotatably driven, through a transmission chain 16, from a suitable motor 17 on the body.

It will be understood that most of the objectives of this invention can be achieved if the agitator 10 is omitted from the body, but the agitator has advantages not only in providing for remixing of the concrete while in transit, to prevent segregation, but also in expediting discharge of concrete mix from the body, inasmuch as the blades 13 can be set at such an angle that they act in the manner of a screw conveyor to propel the mix towards a discharge outlet 18 at the rear end of the body, opposite the wall 14.

In general the body is symmetrical to a vertical plane that lies on the axis of the agitator and passes through the ends of the body. As viewed from either end, the bottom of the body is rounded concentrically with the agitator axis so that the agitator blades can pass closely along the bottom wall as they move through the lower portions of their orbits.

In the normal transit position of the body most of its upper edge lies in a single horizontal plane, but the axis of the agitator is inclined rearwardly and upwardly toward the discharge outlet 18, and the front end wall 14 is normal to the agitator axis and is thus inclined to the vertical. The bottom wall 19 of the body is inclined rearwardly upwardly toward the discharge outlet and also toward the agitator axis from a zone near the front end of the body, and from said zone rearwardly the side walls 20 likewise converge toward the discharge outlet. In effect, therefore, aft of said zone the bottom portion of the body is frustoconical, and the body, when tilted to its discharging position, tends to funnel its contents towards the discharge outlet.

A gate 21, mounted to swing up and down relative to the body, closes the discharge outlet when the body is in its normal transit position.

The frame structure 6 upon which the body proper is tiltably supported comprises, in general, a pair of horizontal sills 22 that have coplanar bottom surfaces adapted to rest on the bed of a flat bed truck, and a pair of upright members 23, one projecting up from each of the sills. In this case the upright members are shown as having an inverted V-shape, each cooperating with a rear end portion of its sill to define a rigid triangle. Cooperating pivot means 24 on the upper ends of the upright members and on the body proper, near its discharge outlet, mount the body on the frame structure for swinging about an elevated horizontal tilt axis which is closely adjacent to the discharge end of the body. This pivotal connection disposes the body over the sills, with its tilt axis transverse to the agitator axis and to the sills.

Upward tilting motion is imparted to the body by means of a single acting hydraulic cylinder 25 having a lower pivotal connection 26 to the frame structure, beneath the discharge outlet, and an upper pivotal connection 27 to the bottom of the body at a distance forwardly from the tilt axis.

A chute 28 can be mounted on the frame structure, beneath the discharge outlet in the body, and can be arranged for horizontal swinging motion and for tilting motion so that it can carry and guide the discharging contents of the body to any desired location near the vehicle. It will be seen that when the body is raised to its discharging position, its discharge outlet is at a desirably high level so that the chute can have ample inclination to produce a fairly rapid flow of mix along it, even when low slump concrete is being placed.

The geometry of the dump body of this invention lends itself well to mounting on a carrying vehicle chassis with the plane of symmetry of the body proper at various angles to the longitudinal centerline of the vehicle chassis. The body can of course be mounted with its plane of symmetry coinciding with that centerline, and with its discharge outlet at the rear of the vehicle, for conventional rear discharge. But a more advantageous body orientation for many purposes is that illustrated in FIGS. 1 and 4, in which the discharge outlet is near the front of the vehicle bed and at the side thereof adjacent to which the operator is normally located for driving the vehicle. In that position, the plane of symmetry of the body is of course oblique to the longitudinal centerline of the vehicle chassis, and discharge from the body is in an obliquely forward direction and at a location such that the operator can readily observe the discharge and can accordingly control tilting of the body as well as positioning of the generally conventional swingable chute 28, without leaving his normal position in the cab 9. To that end, the valves or other manually actuatable controls (not shown) for the chute, gate, agitator, body tilting motor and the like can be located in the driver's cab, and can be connected with their respective motors by means of hoses or other flexible connections that enable the controls to be readily removed from the cab when the dump body structure is dismounted from the vehicle chassis.

The body can be mounted at an oblique orientation to the vehicle chassis without exceeding legal width limitations by reason of the fact that the distance across the body, as measured on horizontal perpendiculars to the body side walls, nowhere exceeds the legal width limitation. Hence the body can be mounted on a flat truck bed with one side wall of the body substantially in a vertical plane that also contains the adjacent side edge of the truck bed, and the vehicle will be within legal width limits. For the body to meet these requirements, and also meet fore-and-aft weight distribution requirements for a six-wheel chassis, its length, as measured along its plane of symmetry, should be no greater than its width measured normal to its plane of symmetry, and the front portions 29 of its side walls should converge forwardly. However, the forwardly convergent portions of the side walls should be relatively quite short as compared with their rearwardly convergent portions. A body having the proportions and shape described above, and meeting an eight-foot width limitation, is capable of carrying at least three and one-half cubic yards of concrete mix.

Because of its geometry, the center of gravity of the loaded body is slightly to the rear of the zone from which the respective front and rear portions of the side walls converge, and is thus on, or very close to, the plane of symmetry of the vehicle chassis, even when the body is obliquely oriented on the chassis.

The body unit 4 is mainly secured to the chassis of the carrying vehicle by means of a single stud or bolt 31 that projects upwardly from the flat bed. When the body unit is being initially placed on the bed, it would be extremely difficult to lower it onto exactly the right spot to engage the bolt 31 in a mating hole in the frame structure, and the arrangement now about to be described overcomes the need for doing so and thus makes for quick and easy installation of the body unit at any desired orientation on a truck bed.

In a zone near the center of gravity of the loaded body the frame structure 6 has means providing coplanar upwardly facing surfaces 33 at opposite sides of a relatively large aperture 34, which surfaces can be overlain by a removable horizontal plate 35 that spans the aperture and has one or more holes 36 in which the bolt 31 is receivable with a fairly close fit. The frame structure also has means providing opposing abutments 37 that cooperate with the plate 35 to confine it against edgewise displacement relative to the frame structure.

It will be seen that the body unit can be lowered onto a truck bed to a general position such that the bolt 31 projects up anywhere in the aperture 34, and can then be slid on the truck bed to an exact position at which the bolt is receivable in a selected one of the holes 36 in the plate 35 and the plate is receivable between the abutments 37.

More specifically, a pair of L-channel cross members 38 bridge the sills 22, which are also L-shaped. The sills have their horizontal flange portions 39 projecting towards one another, and the cross members 38 rest on these but have their horizontal flange portions projecting away from one another. A heavy square or rectangular plate-like member 40, having its central portion cut out to define the aperture 34, is welded to the upright flanges 41 of the cross members 38, midway between the sills. This plate-like member defines the coplanar upwardly facing surfaces 33 upon which the removable plate 35 rests, and the edges of its cutout provide some of the abutments 37 that confine the plate 35 against edgewise motion.

It will be apparent that the single bolt 31 tends to impose rather localized and highly concentrated forces upon the removable plate 35, and consequently that plate must be very sturdy to receive those forces and distribute them over a substantial portion of the frame structure as it transfers them thereto. For this reason the plate 35 is preferably fabricated of upper and lower pieces of steel plate, respectively designated 42 and 43, which are flatwise welded together. The lower plate piece 43 is of such shape and size as to be closely receivable in the aperture 34 in the apertured plate-like member 40 and is of the same thickness as that member. The upper plate piece 42 extends across the apertured plate-like member 40 and is of such length as to have opposite edges engaging the upright flanges 41 of the cross members 38. The several holes 36 in which the bolt 31 is receivable are drilled through both plate pieces, and are so located that in any of the positions in which it may be desired to orient the body on the chassis, a bolt located on the longitudinal centerline of the chassis may be received in one of said holes.

Usually the bed of a flat bed truck is made of wood, or has a decking of relatively thin steel. The body unit can of course exert upward forces on a bolt through the bed, and such forces should preferably be distributed over a substantial portion of the area of the under-surface of the bed, so that the bolt head will not be pulled up through the bed. To this end the head of the bolt can be welded to a fairly thick plate 44 that flatwise underlies the bed, and said plate is tack welded to the underside of the bed, or is fastened to it by screws or the like, to enable the bolt to be removed without undue difficulty at times when the truck is to be used for carrying general cargo of such nature that the presence of the upwardly projecting bolt is undesirable.

To steady the frame structure against rotation about the bolt 31 and against rocking movements lengthwise of the sills, by which the sills might be bent, the ends of the sills are preferably strapped or otherwise readily detachably anchored to the truck bed. It will be appreciated that the moments exerted on the ends of the sills are small, because of their distance from the center of gravity of the body and its load, and consequently the anchorage means at their ends need not be unduly sturdy.

To provide for mixing water with concrete aggregate in the dump body, the body unit can also have a water injection system of this invention, comprising a reservoir 46 that holds a supply of water, nozzle means 47 located in the body proper at a level no higher than that of the agitator axis, a piston pump 48 by which water is drawn from the reservoir and is expelled from the nozzle means under pressure, and suitable hoses and other duct means described hereinafter by which the pump is communicated with the reservoir and with the nozzle means. All of the elements just enumerated can be carried by the frame structure 6 as a part of the body unit.

The location of the nozlle means 47 at a low level in the body insures good distribution of water through the concrete mix, inasmuch as the water tends to rise through the aggregate. Injecting the water in divergent streams under substantially high pressure further insures good initial distribution of the added water through the aggregate, so that a relatively brief operation of the agitator will insure a completely homogeneous mix after water has been thus injected.

The nozzle means preferably comprises two pairs of nozzles, each pair at the bottom of a downcomer 50 that projects down along one side of the body from an elongated shaft 51 that extends along an upper edge of the body. A hose 52 or the like communicates each downcomer with the piston pump 48, to conduct water to the nozzles. Hooks 54 on the shaft engage over the upper edge of a body side wall to hold the shaft in place in such a maner that the unit comprising the shaft, downcomers and nozzles can be readily removed from the body by simply lifting it. Alternatively, the shaft can be hingedly mounted to enable the downcomers to be swung inwardly and upwardly for withdrawing the nozzles from the concrete mix. Removability of the nozzle carrying unit is of course desirable so that the nozzle can be readily inspected and cleaned in the event they become plugged with concrete mix.

The piston pump 48 is preferably double acting, so that a stroke of its piston 55 in either direction constitutes a pump cycle in which water is drawn into the cylinder 56 at one side of the piston and is expelled from the cylinder at the other side of the piston. Since the displacement of the piston in each cycle can be known, cycle-by-cycle operation of the pump 48 enables an accurately controlled volume of water to be injected into the concrete mix. To provide for such pump operation, the pump piston is connected with a double-acting hydraulic motor or ram 58, mounted coaxially with the pump cylinder and controlled by a conventional spool valve 59 of the type that can be manually actuated to a neutral position in which the ram is inactivated and to a pair of operating positions, each of which effects motion of the ram in a different direction. The valve 59 is connected with a hydraulic pump, which can be the same pump that energizes the tilt cylinder 25, to enable the ram to drive the piston pump and through it exert the necessary pressurizing force upon injected water.

The pump cylinder has a port 60 at each end thereof. As shown, each is connected, through a hose 52 and a check valve 63, with one pair of nozzles, and is connected through another check valve 62 with the reservoir. When the pump piston moves in one direction, water is drawn into the expanding chamber of the pump from the reservoir through a check valve 62, which is then unseated, while the check valve 63 associated with the same port prevents return flow of water from its connected pair of nozzles to the expanding chamber. At the same time, water is expelled from the contracting chamber of the pump to its connected nozzles through the check valve 63 communicated with the port for that chamber, while the check valve 62 for that port seats to prevent return flow to the reservoir. If either pair of nozzles should become plugged with concrete mix, that fact will be manifested by failure of the pump drive cylinder 58 to move in the direction to expell water from the clogged nozzles, signifiying that hey should be cleaned. If this signalling advantage is not desired, all of the nozzles could of course be connected, in parallel, to both parts of the pump cylinder, and the shaft 51 could comprise a header communication with the downcomers 50.

From the foregoing description taken with the accompanying drawings it will be apparent that this invention provides a very versatile dump body unit for concrete mix and the like, capable of being readily removably mounted on the bed of a flat bed truck, controllable in its discharge by the driver of the truck without the need for his leaving the cab, and having a capacity to carry well over three cubic yards of concrete without exceeding legal highway vehicle width limitations. It will also be apparent that the dump body unit of this invention affords the loading convenience of an open topped dump body but nevertheless makes ti possible to add a desired amount of water to a batch of mix therein and to achieve a uniform distribution of the water throughout the entire load.

Those skilled in the art will appreciate that the invention can be embodied in forms other than as herein disclosed for purposes of illustration.

The invention is defined by the following claims:

1. A vehicle for transporting and placing concrete, of the type comprising a vehicle chassis having an operator's cab at its front, and a body carried on the chassis for tilting motion up and down relative to the chassis about a horizontal axis near a discharge end of the body, the body being substantially symmetrical about a vertical plane that extends through its ends and having opposite side wall portions that converge towards its discharge end from a zone near its opposite end, said vehicle being characterized by:
   (A) a body being mounted on the vehicle chassis
      (1) with one side edge of the body substantially in a vertical plane that also contains the side edge of the chassis adjacent to which the operator is normally seated, and with said plane of symmetry of the body lengthwise oblique to and intersecting the longitudinal centerline of the chassis, and
      (2) with the discharge end of the body adjacent to the cab and to said side edge of the chassis, so that an operator in the cab can readily observe and control discharge of concrete from the body as it issues therefrom in an obliquely forward direction; and
   (B) the distance across the body, as measured horizontally along perpendiculars to the side walls thereof, being nowhere in excess of the legal width for a highway vehicle.

2. The vehicle of claim 1, further characterized by:
   (C) the body having other opposite side wall portions which converge towards the other end of the body from said zone;
   (D) the body having a bottom wall which is inclined upwardly from said zone to its discharge end when the body is in its normal lowered position of tilting motion so that the center of gravity of the body and its load is substantially on a vertical line through the intersection of said plane of symmetry of the body with said centerline of the chassis.

3. The vehicle of claim 2, further characterized by:
the width of the body as measured perpendicular to said plane of symmetry being at least about as great as its length measured along said plane.

4. A vehicle for transporting and discharging concrete and the like, of the type comprising a vehicle chassis and a body carried on the chassis for tilting motion up and down relative to the chassis about a transverse horizontal axis near a discharge end of the body, the body having opposite sides that converge towards its discharge end from zones near the opposite end of the body and being substantially symmetrical about a vertical plane that extends through its ends, said vehicle being characterized by:
   (A) the vehicle chassis having a flat bed;
   (B) the body being mounted on a frame which carries the body for its tilting motion and which has coplanar undersurfaces adapted to rest on said flat bed, said frame having members which define
      (1) a substantially large aperture in a zone substantially vertically beneath the center of gravity of the loaded body,
      (2) upwardly facing surface portions defining coplanar ledges at opposite sides of the aperture that are adapted to be overlain by a horizontal plate, and
      (3) opposite abutments adjacent to said surface portions between which a plate overlying the ledges can be received and which cooperate with the edges of the plate to prevent relative horizontal motion between it and the frame;
   (C) a bolt extending through the flat bed near the longitudinal centerline of the chassis and projecting up into said aperture;
   (D) a plate overlying said surface portions on the frame and received between said abutments, said plate having a hole therethrough through which the bolt projects with a close fit so that the plate and bolt cooperate to confine the frame against horizontal displacement relative to the bed; and
   (E) means beneath the bed and above the plate engaging the bolt to confine it, said plate, and consequently the frame, against vertical motion relative to the bed.

5. The vehicle of claim 4, further characterized by:
   (F) the body being oriented on the vehicle chassis with one of said sides of the body substantially on a vertical plane that also lies on the adjacent side edge of the bed so that the plane of symmetry of the body is oblique to the longitudinal centerline of the bed, and the body discharges obliquely to one side of the vehicle; and (G) the distance across the body, as measured along horizontal perpendiculars to said sides thereof, being nowhere in excess of the legal width for a highway vehicle.

6. The vehicle of claim 5 wherein the vehicle chassis has an operator's cab at its front, further characterized by:

(H) said side edge of the bed being that which is adjacent to the normal position of the operator; and (I) the discharge end of the body being adjacent to the cab so that the operator can readily observe the discharge of concrete from the body and control the same.

7. A vehicle dump body structure for transporting and discharging concrete and the like, adapted to be removably mounted on a flat bed truck, characterized by:

(A) a body having a discharge outlet at one end thereof;

(B) a frame comprising
 (1) elongated substantially parallel sills with coplanar undersurfaces, and
 (2) a pair of upright members at one end of the sills, spaced apart in the direction transverse to the sills;

(C) cooperating means on the body and on the upright members by which the body is pivotally supported on the frame for tilting motion about a horizontal axis that extends across the body near its discharge end and intersects the upright members near their tops, the last mentioned means disposing the body over the sills;

(D) means on the frame cooperating with the sills to define
 (1) a substantially large aperture between the sills in a zone substantially beneath the center of gravity of the body when the same is loaded, and
 (2) further defining coplanar upwardly facing surfaces at opposite sides of said aperture to be flatwise overlain by a horizontal plate that extends across the aperture;

(E) a plate removably receivable in overlying relationship to said surfaces, said plate having at least one hole therein in which a bolt can be received that projects up from the bed of a flat bed truck and thus confines the plate against horizontal motion relative to the truck bed; and (F) cooperating abutment means on said plate and on the frame adjacent to said surfaces, by which the plate is confined against horizontal motion relative to the frame.

8. The vehicle dump body structure of claim 7, wherein the body has side walls that converge towards its discharge end from a zone that is near its other end, and has a bottom wall which, in the normal transit position of the body, is upwardly inclined from said zone to the discharge end so that the center of gravity of the body and a load therein is nearer said other end of the body, said body also being substantially symmetrical to a vertical plane through its end so that said center of gravity is substantially on said plane, said dump body structure being further characterized by:

(A) the plate having a plurality of holes therein, in each of which a bolt is receivable, so located that with a bolt located substantially on the longitudinal centerline of the vehicle the body can be oriented in any position in which one of said side walls is substantially in a vertical plane that also contains a side edge of the flat bed of a truck on which the body is carried; and (B) the distance across the body, as measured along horizontal perpendiculars to its said side walls, being nowhere in excess of the legal maximum width for on-highway vehicles.

9. In combination with an open top dump body for transporting and discharging concrete mix, means for adding water to concrete mix already in the body and for achieving uniform distribution of the water through the mix, said means comprising:

(A) an agitator in the body, of the type comprising a rotatable shaft and a plurality of bladed arms, axially spaced along the shaft and extending generally radially therefrom, to rotate therewith;

(B) a plurality of outlet nozzles through which water can be forcefully expelled in divergent streams;

(C) means mounting said outlet nozzles in the body, at a level not substantially higher than that of said shaft of the agitator and at locations spaced apart lengthwise of said shaft; and (D) a pump communicated with the outlet nozzles and communicable with a source of water, for supplying water to the nozzles under substantial pressure.

10. The combination of claim 9, further characterized by:

(A) said pump being a piston pump having a predetermined displacement and being operable through a cycle in the course of which it can draw from a source and discharge through the nozzles a predetermined quantity of water; and (B) manually controllable power means for driving the pump and by which the pump can be actuated through one cycle at a time.

11. The combination of claim 10, further characterized by said manually controllable power means for driving the pump comprising:

(A) a double acting hydraulic ram drivingly connected with the pump; and (B) a control valve connected with the ram and with a source of fluid under pressure and having a valve element manually movable to a neutral position in which the ram is inactivated and to each of a pair of operating positions in which the ram is caused to move in a corresponding direction.

12. The combination of claim 9, further characterized by said means mounting the outlet nozzles in the body comprising:

(A) a header communicated with the pump;

(B) means removably securing the header to an upper edge portion of a body side wall with the header extending therealong; and (C) a pair of downcomers extending downwardly along said sidewall from the header and secured to the latter, in communication therewith, one of the nozzles being secured to the lower end of each downcomer.

References Cited
UNITED STATES PATENTS

| | | | |
|---|---|---|---|
| 2,880,977 | 4/1959 | Maxon | 259—171 |
| 3,198,495 | 8/1965 | Maxon | 259—171 |
| 3,424,498 | 1/1969 | Maxon | 259—171 |
| 3,606,277 | 9/1971 | Kader | 259—169 |

ROBERT W. JENKINS, Primary Examiner